United States Patent

[11] 3,595,989

[72] Inventor Leander H. Hoke, Jr.
Southampton, Pa.
[21] Appl. No. 13,889
[22] Filed Feb. 25, 1970
[45] Patented July 27, 1971
[73] Assignee Philco-Ford Corporation
Philadelphia, Pa.

[54] DC-COUPLED CHROMA PROCESSING INTEGRATED CIRCUIT
9 Claims, 3 Drawing Figs.

[52] U.S. Cl. .......... 178/5.4 SD, 330/38 M
[51] Int. Cl. .......... H04n 9/50
[50] Field of Search .......... 178/5.4, 5.4 SD, 5.4 MA; 330/38 M; 331/108 C, 108 D

[56] References Cited
OTHER REFERENCES
" Color TV Processing Using Integrated Circuits" by L. Blaser & D. Bray, IEEE Trans. on Broadcast & TV Rec' rs, Vol. BTR- 12, pp. 54— 60, Nov. 1966 - Copy in 178/5.4
" Integrated Circuits for Television Receivers" by E. Sugata & T Namekawa, IEEE SPECTRUM, May 1969, pp. 64—74 - Copy in 178/5.4

*Primary Examiner*—Robert L. Griffin
*Assistant Examiner*—George G. Stellar
*Attorney*—Herbert Epstein ABSTRACT: A chroma-processing integrated circuit (IC) which provides an amplifier for a color television receiver's chroma reference oscillator, buffers for said oscillator's output, and X- and Z-chroma demodulators. The output of said amplifier is direct current coupled, via the buffers, to the demodulators; thus no coupling capacitors, which would be external to the IC, are required. The buffers, which include appropriate AC and DC level shifting circuitry, also supply the chroma reference oscillator's output to the receiver's chroma kill and reference oscillator phase comparators. The transistors of the IC are temperature compensated by means of a network designed to shift the bias of said transistors, in response to temperature variations, in a direction which offsets the effect of such temperature variations.

SCHEMATIC DIAGRAM OF CHROMA PROCESSING CIRCUITRY

PATENTED JUL 27 1971
3,595,989
SHEET 1 OF 2
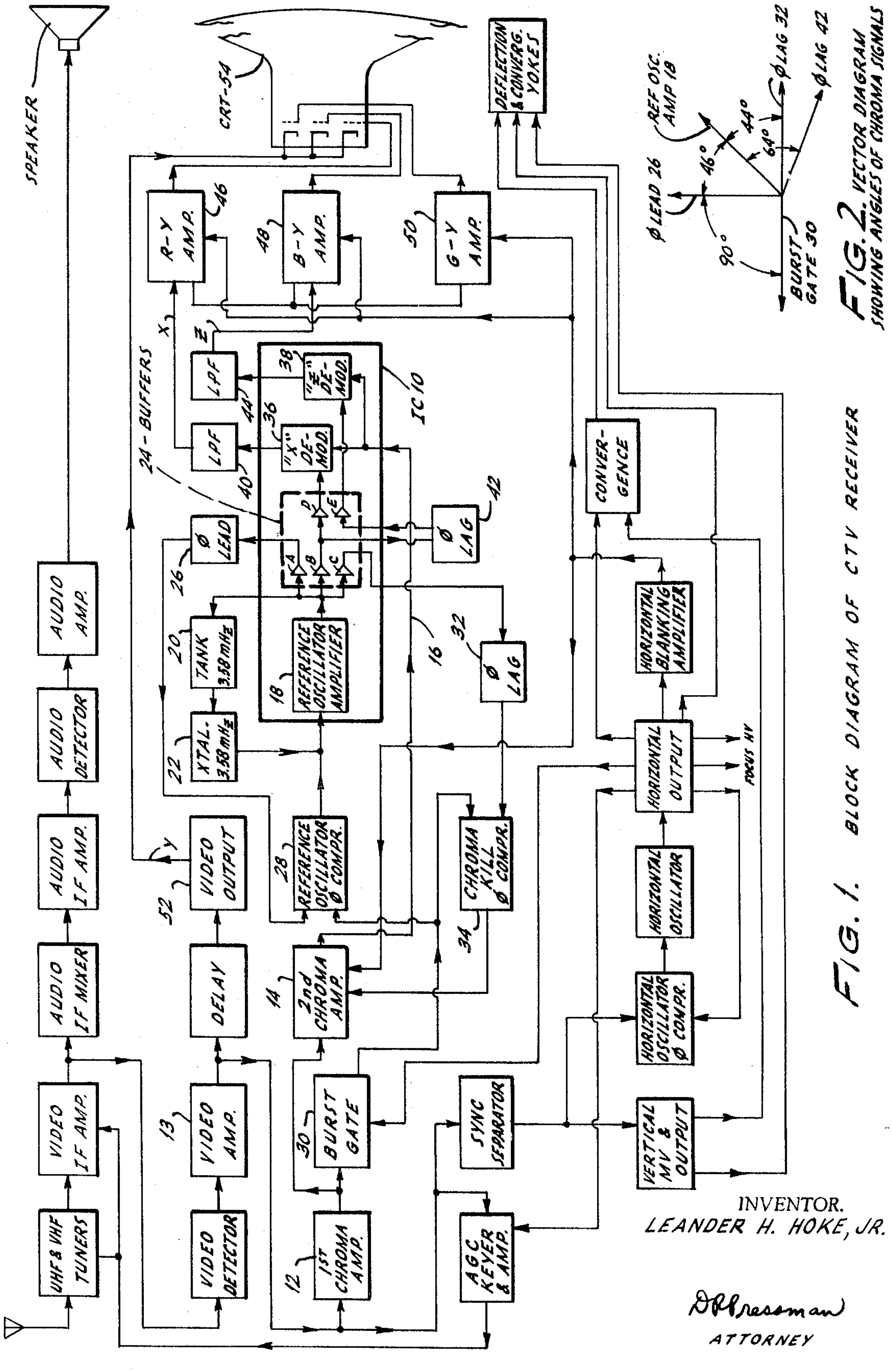
FIG. 1. BLOCK DIAGRAM OF CTV RECEIVER, FIG. 2. VECTOR DIAGRAM SHOWING ANGLES OF CHROMA SIGNALS
INVENTOR.
LEANDER H. HOKE, JR.
D.P. Grassman
ATTORNEY

INVENTOR.
LEANDER H. HOKE, JR.

ATTORNEY

DC-COUPLED CHROMA PROCESSING INTEGRATED CIRCUIT

BACKGROUND OF THE INVENTION

This invention relates generally to color television receiver circuitry and particularly to an integrated circuit (IC) for use in a color television receiver. The IC performs various functions on the chroma (color-information) signals in said receiver.

As is well known, color television (CTV) receivers in commercial use today must include means for generating a chroma-reference signal which bears a predetermined phase relationship to the received color bursts. The chroma-reference signal is required to demodulate the received chroma subcarrier in order to derive color difference signals which can be used (after slight modification) to reproduce the original color image on the screen of the color cathode ray tube (CRT).

Heretofore the circuitry for generating the chroma-reference signal and demodulating the chroma subcarrier had certain drawbacks, whether the circuitry comprised tubes or transistors. The chroma-reference signal was generated by means of a chroma-reference oscillator which required capacitive coupling means, tuned transformer coupling means, or both, to couple the oscillator's output to subsequent stages, such as the chroma demodulators. Since such coupling means comprises relatively large, heavy, unreliable, and expansive coupling capacitors and inductors, it would be highly desirable if such means could be eliminated. However, it is not easily possible to eliminate such coupling means in complex high frequency circuitry of the type required in a color television receiver. Capacitive coupling was required in order to prevent the direct current bias levels of a preceding stage from affecting the operation of a succeeding stage. Tuned coupling means, which included relatively expensive inductors as well as capacitors, was thought to be required in order to block transmission of harmonics and other spurious signals to the succeeding stage.

The foregoing problems were enhanced because the circuitry under consideration must be temperature insensitive; otherwise, ambient temperature changes, which occur normally to television receiver circuitry, will shift critical bias voltages in the chroma circuitry of the receiver, which shifts in turn change signal voltages, thereby adversely affecting color fidelity. Thus, means for compensating the adverse effects of ambient temperature changes are required. Such means heretofore generally comprised cathode or emitter degeneration resistors, which necessitated the use of additional capacitors for bypassing such resistors.

Accordingly, two objects of the present invention are: (1) to provide a chroma-processing circuit for a CTV receiver which does not require capacitive or tuned coupling means or capacitive bypass means, and (2) to increase the reliability and decrease the cost, weight, and size of color television receiver circuitry. Other objects are: (3) to provide a novel and effective temperature compensation and interstage coupling means for the chroma circuitry in a CTV receiver, and (4) to provide a novel type of integrated circuit for a CTV receiver. Further objects and advantages of the invention will be apparent from a consideration of the ensuing description thereof.

BRIEF DESCRIPTION OF THE DRAWINGS

FIG. 1 is a block diagram of a CTV receiver incorporating a chroma-processing circuit according to the invention.

FIG. 2 is a vector diagram showing the relative phase angles of the color burst, reference, and chroma signals present in the systems diagrammed in FIGS. 1 and 3.

DESCRIPTION OF THE PREFERRED EMBODIMENT

Figure 3:
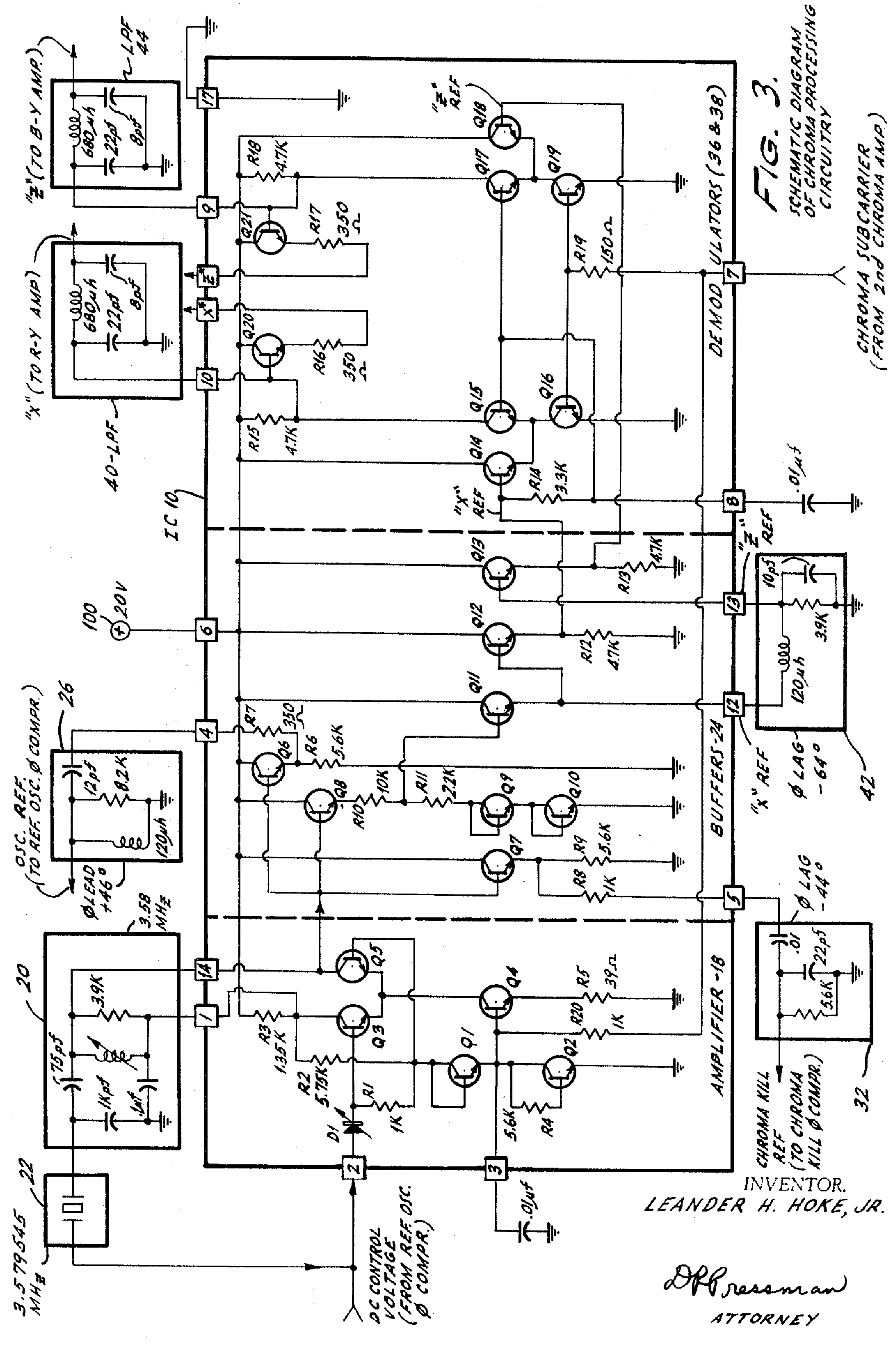
FIG. 3 is a schematic diagram of the chroma-processing circuit of FIG. 1, together with associated chroma-processing circuitry.

FIGS. 1 and 2—Block and Vector Diagrams

FIG. 1 shows a block diagram of a complete CTV receiver incorporating a chroma-processing circuit according to the invention. Since the general operation of the receiver of FIG. 1 will be well understood by those skilled in the art by reference to the diagram, no explanation thereof will be given. However, the construction and operation of the chroma circuitry of the receiver, and especially the chroma-processing circuit of the invention, will be described in detail.

The chroma-processing circuit of the invention comprises an integrated circuit (IC) 10, the major functional units of which are indicated by labeled blocks within IC 10 of FIG. 1 and the individual actual electrical components of which are indicated within IC 10 of FIG. 3. An integrated circuit comprises a monolithic (i.e., monocrystalline) chip of semiconductive material, usually silicon, about 50 mils square in which circuit components, such as transistors, diodes, and resistors, have been formed, usually by the diffusion of impurities into regions adjacent to the chip's surface. The thusly formed components usually are interconnected by means of thin metallic strips which are formed over an insulating film on the chip's surface. The actual physical construction of the IC of the present invention will not be described since one skilled in the IC art readily will be able to construct the IC of the invention from the present disclosure. An example of a schematically diagrammed circuit and an IC layout therefor is shown in U.S. Pat. No. 3,447,092 of the present inventor, issued May 27, 1969. Techniques for the construction of IC's are discussed in Integrated Circuits, by Warner (ed.) et al. (McGraw-Hill 1965). Details of the main functional units within IC 10 will be discussed in the course of the following description of the chroma circuitry of the receiver of FIG. 1, and details of the actual circuitry of IC 10 will be discussed under the discussion of FIG. 3.

The first chroma amplifier 12 of the receiver of FIG. 1 is a band-pass amplifier which, in well-known fashion, selects the chroma subcarrier and color bursts from the output of the video amplifier 13.

The burst gate 30, by a well-known time selection process, selects the color bursts from the signal appearing in the output of first chroma amplifier 12. The phase of the bursts (the output of burst gate 30) is shown in FIG. 2 in relation to the phases of other signals in the receiver which have the same frequency as the chroma subcarrier.

The second chroma amplifier 14, again by a well-known time selection process, selects the chroma subcarrier from the output of first chroma amplifier 12.

The receiver includes a chroma reference oscillator, consisting of reference oscillator amplifier 18 (which is part of IC 10) and tuned feedback circuitry comprising tank 20 and piezoelectric crystal 22 (which are external to IC 10 and are connected between the output and the input of amplifier 18 of IC 10). The phase of the output of reference oscillator 18, when controlled as described infra, is indicated in FIG. 2.

The buffers 24 within IC 10 include five individual buffers A to E, of which buffers A to C have their inputs connected in parallel to the output of amplifier 18, buffer D has its input connected to the output of buffer B, and buffer E has its input connected to the output of buffer B by a phase (Φ) lag circuit 42. As shown in FIG. 2, lag circuit 42 shifts the phase of the output signal of amplifier 18 by about 64°.

Phase lead circuit 26 has its input connected to the output of buffer A and, as indicated in FIG. 2, provides a phase lead of about 46° to the output signal of amplifier 18.

Reference oscillator phase comparator 28 has two inputs, one connected to the output of phase lead circuit 26 and the other connected to the output of burst gate 30. When its two signals do *not* have the quadrature relationship indicated in FIG. 2, comparator 28 transmits to amplifier 18 a phase-adjusting DC error signal. The chroma-reference oscillator including amplifier 18 responds to this error signal by shifting the phase of the output signal of amplifier 18 in such direction as to establish the aforementioned quadrature relationship and thereby control the phase of the output signal of amplifier 18 so that it is at the desired angle with respect to the bursts, i.e., leading the bursts by about 136°.

Phase lag circuit 32 has its input connected to the output of buffer C and, as indicated in FIG. 2, shifts the output signal of amplifier 18 by −44°.

Chroma kill phase comparator 34 has two inputs, one connected to the output of phase lag circuit 32 and the other connected to the output of burst gate 30. When its two input signals do *not* have approximately the 180° relationship indicated in FIG. 2, comparator 34 supplied to the second chroma amplifier a chroma kill signal which disables amplifier 14. Thereby amplifier 14 will not provide any chroma subcarrier at its output when no burst is being supplied to amplifier 14 or the output of amplifier 18 does not have approximately the proper phase angle; this prevents the receiver from reproducing spurious colors.

The X-demodulator 36 in IC 10 receives two inputs: the chroma-reference signal from amplifier 18 (via buffers B and D) and the chroma subcarrier from amplifier 14. The chroma subcarrier is demodulated in well-known fashion by the chroma-reference signal in demodulator 36 to produce an X-color-difference signal.

The Z-demodulator 38 in IC 10 also receives two inputs: the output of phase lag circuit 42 (via buffer E) and the chroma subcarrier from chroma amplifier 14. The chroma subcarrier is also demodulated in well-known fashion in demodulator 38 to produce a Z-color-difference signal.

Low-pass filter (LPF) 40 passes the X-signal from the output of demodulator 36 and blocks transmission of the chroma frequency signals and their harmonics.

Similarly, LPEF 44 transmits only the "Z" signal from the output of demodulator 38.

The R-Y amplifier 46 receives the X-signal from LPF 40 and the B-Y amplifier 48 receives the Z-signal from LPF 44. Amplifiers 46 and 48 are interconnected in well-known fashion to each other and to G-Y amplifier 50; the three amplifiers constitute a matrixing circuit which derives by arithmetic operations three color difference signals (R-Y, B-Y, and G-Y) from the X and Z-signals.

Cathode-ray tube (CRT) 54 receives the three color difference signals, R-Y, B-Y, and G-Y, from amplifiers 46, 48, and 50, respectively. CRT 54 also receives a monochrome or luminance (Y) signal from video output circuit 52 and reproduces the originally televised image in response to all four of the foregoing signals and well-known magnetic deflection and convergence inputs.

Fig. 3 Schematic Diagram

FIG. 3 shows the circuitry within IC 10 of the FIG. 1, together with the rest of the chroma circuitry closely associated with IC 10 in the CTV receiver of FIG. 1. The numbers within square boxes around the periphery of IC 10 designate the external leads of IC 10.

The reference oscillator amplifier 18, shown in the left-hand section of IC 10, comprises five transistors, Q1 to Q5, together with a variable capacitance diode D1 and six resistors. Transistors Q3 and Q5 are the active elements of a differential amplifier. The emitters of Q3 and Q5 are commonly connected to a constant current source comprising transistor Q4 and resistor R5. The collector of Q3 is connected directly to a common collector load resistor R3 which in turn is connected to a positive source 100 via terminal 6 of IC 10. The collector of Q5 is connected via terminal 14 to tank 20 which provides a direct current path from terminal 14 to terminal 1 and thence to common collector load resistor R3. A feedback signal is supplied from tank 20 via crystal 22 to terminal 2 of IC 10. Terminal 2 is connected via variable capacitance diode D1 to the base of transistor Q3. Because the capacitance of diode D1 varies in response to variations in the value of the DC control voltage supplied to diode D1 at terminal 2 by phase comparator 28, and because this variation in capacitance varies the phase of the feedback signal supplied to the base of transistor Q3, diode D1 controls the phase and frequency of the output signal of reference oscillator amplifier 18 in response to the DC control voltage.

In addition to the temperature stability provided by the use of a differential amplifier including transistors Q3 and Q5, additional temperature stability is provided by transistors Q1 and Q2 as follows. As is well known, the base-emitter voltage of a transistor having a fixed base bias will be affected by temperature such that the collector current of the transistor will increase as ambient temperature rises. Thus, as ambient temperature rises, the base-emitter voltage of Q4 will tend to change in a direction which will cause the collector current of Q4 to increase; such action is undesirable as it will affect adversely the operation of amplifier 18. Similarly, the base-emitter voltage of Q3 and Q5 will tend to be affected by ambient temperature changes, thereby also adversely affecting the operation of amplifier 18. To compensate these undesirable temperature-induced effects, a temperature-compensating circuit including R2, R1, Q1, R4, and Q2 is provided. Such circuit operates as follows:

Transistor Q2, whose collector is connected to its base via resistor R4, acts as a diode in series with a resistor. That is, the base-emitter diode of Q2, in series with resistor R4, is connected from the emitter of Q1 and the base of Q4 to ground. As is known, the impedance of a diode decreases with increasing temperature; this causes the voltage at terminal 3 (the emitter of Q1 and the base of Q4) to fall as temperature increases; this voltage falls at a rate of about 2 millivolts per degree C. Such a fall in voltage tends to decrease the forward bias on Q4; the value of R4 is selected to compensate the aforementioned tendency of the collector current of Q4 to increase with temperature.

In similar fashion, the diode-connected transistor Q1 provides compensation at the bases of Q3 and Q5, thereby tending to cause the collector currents of both of these transistors to remain constant as temperature increases. Resistor R1 provides isolation between Q1 and the base of Q3 to prevent the feedback signal from crystal 22 from being dissipated in Q1.

In addition to compensating the collector current of Q4, Q2 also compensates the collector currents of Q16 and Q19 of the demodulator circuits of the right-hand side of IC 10 in the manner aforedescribed, since the collector of Q2 is connected to the bases of Q16 and Q19 via R20 and R19.

The output of the chroma-reference oscillator is taken at the collector of Q5 and is directly coupled to the bases of buffer transistors Q7, Q8, and Q6.

Buffer C of FIG. 1 comprises transistor Q7 and resistors R9 and R8 which constitute an emitter follower circuit for providing isolation between the output of amplifier 18 and the chroma kill phase lag circuit 32.

Buffer A of FIG. 1 comprises Q6, R6, and R7, which constitute an emitter follower circuit for providing isolation between the output of amplifier 18 and the phase lead circuit 26.

Buffer B of FIG. 1 comprises (1) a first emitter follower circuit comprising Q8, R10, R11, two diode-connected transistors Q9 and Q10, and (2) a second emitter follower circuit comprising Q11. Buffer B provides isolation between the output of amplifier 18 and subsequent circuitry within IC 10. In addition, diode-connected transistors Q9 and Q10 allow buffer B to provide two further functions. Q9 and Q10 provide temperature compensation to the base of Q11 in the manner aforedescribed with reference to Q1 and Q2. Since Q11 is directly coupled to transistors Q12, Q13, Q14, Q15, Q17, and Q18, this temperature compensation action of Q9 and Q10 also partially compensates these transistors. In addition, Q9 and Q10, being nonlinear devices, also provide a lower dynamic impedance than static impedance, whereby the buffer stage including Q8 will attenuate the AC signal fed therethrough from the collector of Q5 more than it will attenuate the DC bias fed therethrough from the collector of Q5. The AC signal is attenuated to one-sixth of its value of the collector of Q5 and the DC bias level is attenuated to one-fourth of its value at the collector of Q5. This serves to adjust the bias and signal levels available at the collector of Q5 to levels which are compatible with subsequent stages. R11, Q9, and Q10 are selected to provide the proper proportions of AC and DC attenuation.

The stage including Q11 includes the phase lag circuit 42 in the emitter thereof; circuit 42 provides direct current coupling between terminals 12 and 13 in order to couple the temperature-compensated bias level at the base of Q11 to subsequent stages.

The output of Q11 is also connected to buffer D which includes Q12 and R12, an emitter follower stage which feeds the output of the chroma-reference oscillator (the X-reference signal) to the X-demodulator (transistors Q14, Q15, and Q16).

The output of phase lag circuit 42 is a phase shifted version of the X-reference signal, i.e., a Z-reference signal, which drives buffer E, which comprises Q13 and R13. Buffer E drives the Z-demodulator (transistors Q17, Q18, and Q19).

In the X-demodulator, Q14 and Q15 comprise a differential amplifier which receive a constant DC operating current from the temperature-compensated transistor Q16. The X-reference signal is applied to the base of Q14 and the output signal from the demodulator is taken at the collector of Q15. In the Z-demodulator, Q17 and Q18 comprise a similar differential amplifier which receive constant current from the temperature-compensated transistor Q19; the Z-reference signal is applied to the base of Q18 and the demodulator's output is taken at the collector of Q17. The temperature compensation bias at the base of Q14, which was derived from diode-connected transistors Q9 and Q10, is coupled to the base of Q15 and Q17 by R14, which provides signal isolation between the base of Q14 and the bases of Q15 and Q17. The base of Q18 is direct current coupled via Q13, phase lag circuit 42, and Q11, to transistors Q9 and Q10, so that it also receives temperature compensation.

The outputs of the X and Z demodulators are supplied at output terminals 10 and 9 of IC 10, respectively, to low-pass filters 40 and 44.

The X-demodulator's output, taken at the collector of Q15, is also connected to a buffer stage including emitter follower-connected transistor Q20, to provide an optional low-impedance X-output at terminal X* for driving low-impedance (e.g., transistor) matrixing circuits. A similar buffer circuit including Q21 is provided to provide an optional low-impedance output at terminal Z* from the Z-demodulator.

From the foregoing, it can be seen the use of integrated circuit 10 in a CTV receiver obviates (1) the need for capacitive and tuned coupling means between the chroma-reference oscillator and the chroma demodulators and (2) the need for capacitive bypass means in shunt with emitter of cathode degeneration resistors. The foregoing undesirable coupling and bypass means are eliminated through the use of direct coupling via the appropriate isolation-providing, signal-level-shifting, and bias-level-shifting buffer stages aforedescribed, which are interconnected to the noncapacitive temperature compensation system aforedescribed. Direct current coupling throughout the chroma-processing circuit, together with an interconnected temperature compensation system, are possible because all of the components within IC 10 are formed within a single, miniscule, monolithic chip of semiconductive material, thereby permitting ambient temperature variations to affect all components equally.

Exemplary values are indicated in FIG. 3 for the circuit components illustrated therein. However, the invention is not limited to a circuit having components of those values, and components having other values may be substituted therefor. Although the circuit is shown employing NPN transistors, PNP transistors can be used alternatively if the polarity of the DC source 100 is reversed.

I claim:

1. A chroma-processing integrated circuit for use in a color television receiver comprising:

1. an amplifying stage including at least one transistor and having a common terminal, an output terminal to which a tuned circuit can be connected, and an input terminal for receiving a feedback signal from said tuned circuit, thereby to provide an amplifier for a chroma-reference oscillator,
2. a first buffer stage comprising at least one transistor for providing isolation for the output of said amplifying stage, the output of said amplifying stage being direct current coupled to the input of said first buffer stage,
3. a second buffer stage, comprising at least one transistor, for providing isolation between an input terminal of said second buffer stage and a first demodulating stage, said first and second buffer stages arranged to provide direct current coupling from the output of said amplifying stage to said first demodulating stage when a direct current coupled phase-shifting circuit is connected between the output of said first buffer stage and the input of said second buffer stage,
4. said first demodulating stage including at least one transistor and having a first input terminal for receiving a chroma subcarrier signal, a second input terminal for receiving a first synchronous demodulating signal, and an output terminal for supplying a first color difference signal produced by a first mode of demodulation of said subcarrier, said output terminal of said second buffer stage being direct current coupled to said second input terminal of said first demodulating stage for supplying said first synchronous demodulating signal thereto, and
5. a second demodulating stage including at least one transistor and having a first input terminal for receiving said chroma subcarrier signal, a second input terminal for receiving a second synchronous demodulating signal, and an output terminal for supplying a second color difference signal produced by a second mode of demodulation of said subcarrier, said output terminal of said first buffer stage being direct current coupled to said second input terminal of said second demodulating stage,
6. the active and passive elements of all of the foregoing stages being comprised within a monocrystalline chip of semiconductive material.

2. The integrated circuit of claim 1 further including a third buffer stage, comprising at least one transistor, for providing isolation between the output of said amplifying stage and the input of said first buffer stage, said third buffer stage providing direct coupling from the output of said amplifying stage and the input of said first buffer stage and including means for adjusting the direct current bias and alternating current signal levels present at the output of said amplifying stage by respectively different proportions.

3. The integrated circuit of claim 2 wherein said means for adjusting said bias and signal levels comprises a nonlinear circuit element connected in shunt with the signal path through said third buffer stage.

4. The integrated circuit of claim 1 further including temperature-compensating means connected across the base-emitter circuit of said transistor of said amplifying stage, said means arranged to reduce temperature-induced variations in collector current of said transistor by adjusting the bias of said transistor in a direction which counteracts said temperature-induced collector current variations.

5. The integrated circuit of claim 1 wherein 1. said amplifying stage includes at least a second transistor, the emitter-collector path of which is connected to form a series circuit with the emitter-collector path of said first-named transistor and which is biased to supply a substantially constant current to said first transistor,
2. said demodulating stages each include at least a second transistor, the emitter-collector path of which is connected to form a series circuit with the emitter-collector path of said first-named transistor, said chroma subcarrier signal being supplied to said second transistor of each of said demodulating stages to control the collector current in each of said second transistors, said first and second synchronous demodulating signals being supplied to said first transistor of each demodulating stage to control the collector current in each of said first transistors, 3. said integrated circuit further including temperature-compensating means connected in common across the base-emitter circuits of said second transistors of said amplifying and demodulating stages, said means arranged to reduce temperature-induced variations in collector current of said second transistors by adjusting the bias of said transistors in a direction which counteracts said temperature-induced collector current variations.

6. The integrated circuit of claim 1 further including temperature-compensating means connected in shunt with the direct current coupling between the output of said amplifying stage and said first buffer stage, said temperature-compensating means arranged to change the bias at the input of said first buffer stage in a direction, which when translated to said demodulating stages, tends to reduce temperature-induced collector current variations in the collector of each of said transistors of said demodulating stages.

7. The integrated circuit of claim 6 wherein said temperature-compensating means comprises unilaterally conductive means.

8. The integrated circuit of claim 1 wherein said amplifying stage includes means, responsive to a direct current control signal, for adjusting the phase and frequency of the output of said amplifying stage.

9. The integrated circuit of claim 8 wherein said means for adjusting the phase and frequency comprises a variable capacitance diode.